United States Patent
Ikenoue

(10) Patent No.: US 8,879,787 B2
(45) Date of Patent: Nov. 4, 2014

(54) INFORMATION PROCESSING DEVICE AND INFORMATION PROCESSING METHOD

(75) Inventor: Shoichi Ikenoue, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 513 days.

(21) Appl. No.: 13/147,979

(22) PCT Filed: Oct. 23, 2009

(86) PCT No.: PCT/JP2009/005584
§ 371 (c)(1),
(2), (4) Date: Oct. 10, 2011

(87) PCT Pub. No.: WO2010/095191
PCT Pub. Date: Aug. 26, 2010

(65) Prior Publication Data
US 2012/0039507 A1    Feb. 16, 2012

(30) Foreign Application Priority Data

Feb. 19, 2009    (JP) .................................. 2009-037214

(51) Int. Cl.
*G06K 9/00* (2006.01)
*G06F 3/01* (2006.01)
*G06T 7/20* (2006.01)

(52) U.S. Cl.
CPC ............ *G06F 3/012* (2013.01); *G06K 9/00234* (2013.01); *G06K 9/00315* (2013.01); *G06K 9/00362* (2013.01); *G06T 7/2046* (2013.01); *G06T 7/208* (2013.01); *G06T 2207/30201* (2013.01); *A63F 2300/1093* (2013.01); *A63F 2300/6045* (2013.01); *G09G 2354/00* (2013.01)
USPC .......................................... 382/103; 382/154

(58) Field of Classification Search
None
See application file for complete search history.

(56) References Cited

U.S. PATENT DOCUMENTS 6,771,277 B2    8/2004  Oba
7,050,078 B2 *  5/2006  Dempski ...................... 715/700
(Continued)

FOREIGN PATENT DOCUMENTS

JP          08329254 A      12/1996
JP        2000222585 A       8/2000
(Continued)

OTHER PUBLICATIONS

Supplementary European Search Report for corresponding EP application 09840298, dated Jul. 3, 2012.

(Continued)

*Primary Examiner* — Matthew Bella
*Assistant Examiner* — Weiwen Yang
(74) *Attorney, Agent, or Firm* — Matthew B. Dernier, Esq.; Gibson & Dernier LLP

(57) ABSTRACT

An image acquisition unit of an information processing device acquires data for moving image including an image of a user and captured by an image capturing device. An initial processing unit determines correspondence between an amount of movement of the user and a parameter defining an image to be ultimately output in a conversion information storage unit. A tracking processing unit uses a particle filter to perform visual tracking in the moving image so as to estimate the magnification and translation amount of the user's head contour. The input value conversion unit converts the amount of movement of the user into the parameter defining an image using the magnification and the translation amount as parameters. The output data generation unit generates an image based on the parameter. The output control unit controls the generated image so as to be displayed on a display device.

16 Claims, 8 Drawing Sheets

(56) References Cited

U.S. PATENT DOCUMENTS

| | | |
|---|---|---|
| 7,978,174 B2 | 7/2011 | Lim |
| 2002/0097247 A1 | 7/2002 | Oba |
| 2004/0190776 A1* | 9/2004 | Higaki et al. ................ 382/190 |
| 2006/0252475 A1 | 11/2006 | Zalewski |
| 2007/0285386 A1 | 12/2007 | Lim |
| 2008/0063236 A1* | 3/2008 | Ikenoue et al. ............... 382/103 |
| 2008/0298637 A1* | 12/2008 | Hu et al. ...................... 382/103 |

FOREIGN PATENT DOCUMENTS

| | | | |
|---|---|---|---|
| JP | 2001056646 A | 2/2001 | |
| JP | 2002063578 A | 2/2002 | |
| JP | 2002196855 A | 7/2002 | |
| JP | 2002351603 A | 12/2002 | |
| JP | 2007316882 A | 12/2007 | |
| JP | 2007328781 A | 12/2007 | |
| JP | 2008015942 A | 1/2008 | |
| WO | 2009002503 A1 | 12/2008 | |

OTHER PUBLICATIONS

Office Action issued for corresponding Japanese Patent Application No. 2009-037214, dated Jun. 4, 2013.

Office Action issued for corresponding Japanese Patent Application No. 2009-037214, dated Oct. 1, 2013.

International Search Report for corresponding application PCT/JP2009/005584, dated Mar. 23, 2010.

International Preliminary Report on Patentability and Written Opinion for corresponding application PCT/JP2009/005584, dated Sep. 13, 2011.

Office Action issued for corresponding Chinese Patent Application No. 200980156868.8, dated Sep. 4, 2013.

Office Action issued for corresponding Japanese Patent Application No. 2009-037214, dated Feb. 12, 2014.

* cited by examiner

INFORMATION PROCESSING DEVICE AND INFORMATION PROCESSING METHOD

TECHNICAL FIELD

The present invention relates to information processing technology and, more particularly, to an information processing device that includes a user interface for performing processes responsive to user inputs and to an information processing method executed in the device.

BACKGROUND ART

Electronic devices including game devices and home appliances that are available in recent years provide significantly advanced functions. In association with this, the system that allows a user to provide an input through a user interface has become increasingly complicated. Various improvements have been made to user interface so that a use can provide an input easily using such a complicated input system. For example, attempts have been made to use different approaches to assignment of functions to controller buttons or to use a touch panel. Also proposed are technologies that use an image capturing device designed to capture an image of the user as a user interface so as to initiate various events by detecting the state of the user's face (see, for example, patent document No. 1).

By using an image capturing device as a user interface, an ordinary face recognition technology can be used to detect the state of the user's face. For example, a matching score may be computed between a reference image prepared in advance and an image of a detected facial region. Alternatively, the orientation or tilt of a face is determined by referring to the area of a facial region.

Details of certain systems and devices may be found in JP 2008-15942.

In association with the advancement in information processing technology and diversification in environments in which electronic devices or information processing devices are used, in users, and in processing details, different user interfaces are required depending on the factor that causes the difference. Therefore, the mode of user interface should be more diversified to capture such needs. In particular, there is called for a user interface that allows a user to provide an input through a more natural movement without experiencing a complex process of, for example, providing an input using a large number of buttons.

SUMMARY OF THE INVENTION

The present invention addresses the aforementioned issue and a purpose thereof is to provide an information processing technology that includes a user interface capable of providing accurate and versatile ways of providing an input through the movement of a person.

One embodiment of the present invention relates to an information processing device. The information processing device comprises: an image capturing device configured to capture a movement of an object within a moving image; an input value acquisition unit configured to estimate an amount of movement of the object with respect to the image capturing device from a reference position in a three-dimensional space defined in the vertical, horizontal, and depth directions, in the moving image by referring to a contour line of the object; and an output data generation unit configured to make a change in a performing process according to the amount of movement in the three-dimensional space that is estimated by the input value acquisition unit and to generate output data accordingly.

Another embodiment of the present invention also relates to an information processing device. The information processing device comprises: an image capturing device configured to capture a movement of an object within a moving image; an input value acquisition unit configured to estimate an amount of movement of the object with respect to the image capturing device from a reference position in a two-dimensional space defined in vertical and horizontal directions, and further estimate a distance in the depth direction from the reference position, from the moving image; and an output data generation unit configured to make a change in a performing process according to the amount of movement in the two-dimensional space estimated by the input value acquisition unit and generate output data accordingly, wherein the input value acquisition unit estimates an actual amount of movement in the vertical and horizontal directions by correcting an apparent amount of movement in the vertical and horizontal directions determined by using the image capturing device, based on the distance of the object from the reference position in the depth direction.

Still another embodiment of the present invention relates to an information processing method. The information processing method comprises: capturing a movement of an object within a moving image using an image capturing device; estimating an amount of movement of the object with respect to the image capturing device from a reference position in a three-dimensional space defined in the vertical, horizontal, and depth directions, in the moving image by referring to a contour line of the object; and making a change in a performing process according to the estimated amount of movement in the three-dimensional space and generating output data accordingly.

Optional combinations of the aforementioned constituting elements, and implementations of the invention in the form of methods, apparatuses, systems, computer programs, and recording mediums having embodied thereon a computer program may also be practiced as additional modes of the present invention.

According to the present invention, natural movement of a user can be used to provide an input value so that a variety of processes are performed with high precision.

DETAILED DESCRIPTION OF THE INVENTION

Figure 1:
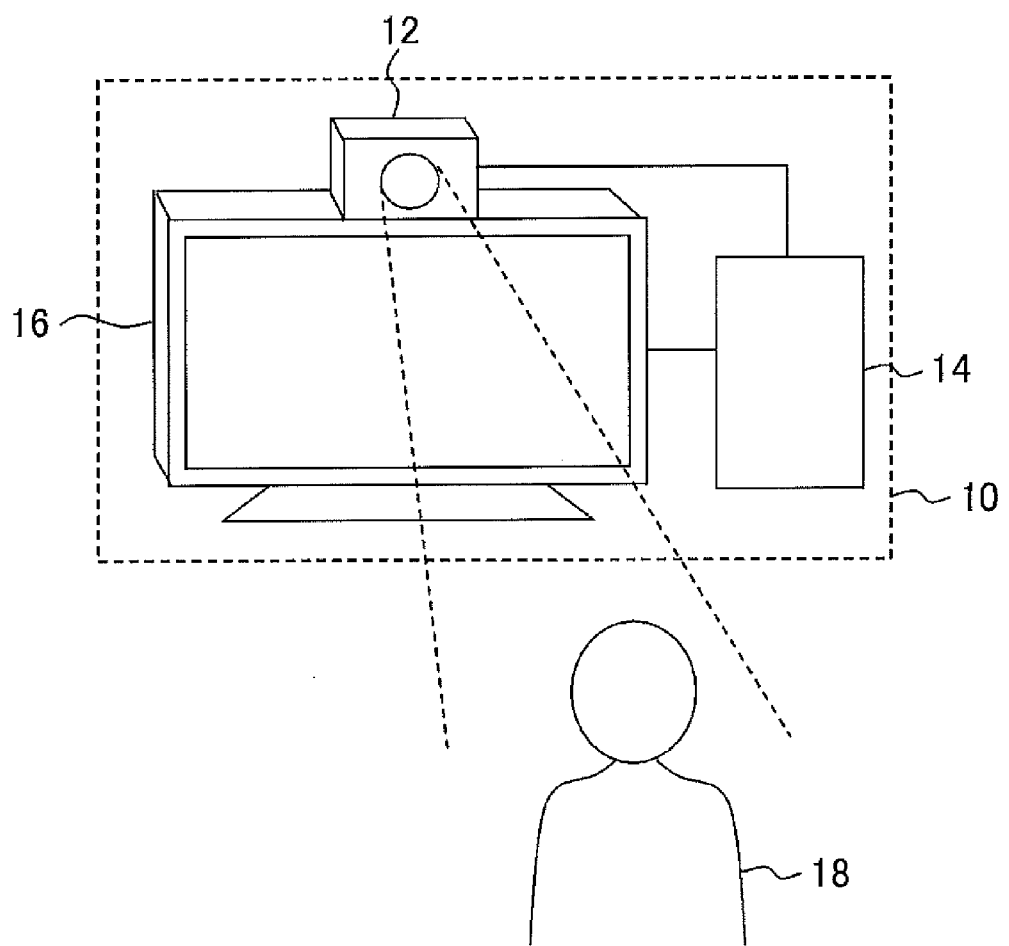
FIG. 1 shows the configuration of an information processing system to which the embodiment is applicable.

FIG. 1 shows the configuration of an information processing system to which the embodiment is applicable. An information processing system 10 comprises an image capturing device 12 configured to capture an image of a user 18, an information processing device 14 configured to detect the user's action and perform image processing accordingly, and a display 16 configured to output image data obtained as a result of processing by the information processing device.

Connection from the information processing device 14 to the image capturing device 12 or to the display 16 may be wired or wireless or they may be connected through specific networks. Alternatively, any two of or all of the image capturing device 12, information processing device 14, and display 16 may be integrally provided. The image capturing device 12 may not necessarily be mounted on the display 16. In the following description, the image capturing device 12 is assumed to capture an image of the user 18 facing the display 16 from front. However, a similar process can be performed using simple coordinate conversion, even if the direction of imaging differs. The direction that the image capturing device 12 faces is defined as "depth direction". The three directions including the "depth direction" in addition to the "vertical direction" and "horizontal direction" defined in the plane flush with the lens surface are defined as axes in the three-dimensional space in which the user moves.

The image capturing device 12 captures data of an image that includes the user 18 at a predetermined frame rate. The moving image data acquired is input into the information processing device 14. The information processing device 14 detects an action of the user from the moving image data acquired from the image capturing device 12. In this embodiment, information on the movement in the direction of depth with respect to the image capturing device 12 is also acquired in order to increase the flexibility of input provided by the user using his or her own action. By detecting the movement in the direction of depth, not only a parameter associated with the depth direction can be input but also the movement in the vertical direction and horizontal direction can be detected accurately. The specific method will be discussed later. As a result, the flexibility of input is far improved in comparison with the case of merely detecting the movement on an image plane.

The information processing device 14 detects the user's action including the movement in the depth direction, and changes the process accordingly. The content of processes performed by the information processing device 14 other than those related to user interface are non-limiting. For example, games may be designed such that an image displayed on the display 16 is defined as the field of view of the user 18, or an object corresponding to the user 18 may be displayed as an avatar to let the user moving in a virtual space such as a cave or a city take various actions. Various types of games (e.g., role playing games, shooting games, boxing games, or football games) may use a game situation as described above. Other than games, the user may enjoy shopping at a virtual store in the virtual space or select an object displaying a menu of processes.

All of these processes are based on an idea of linking an image displayed on the display 16 with an action of the user 18. Application of the embodiment is not limited to the described examples. The embodiment can be applied to any application operated in response to the user's input. By way of further examples, the embodiment may be used to switch television programs or web sites displayed on the display 16 in accordance with the user's action, by establishing correspondence between the user's action and the process. Alternatively, the embodiment may be used to allow selection form a menu and may not display an image. The embodiment merely uses a simple change embodied by the user's action to provide an "input value" but can be combined with various applications because it provides high flexibility in providing inputs and high precision in detecting "input values".

The display 16 acquires image data generated by reflecting the result of detection of the action of the user 18 by the information processing device 14 and outputs the image accordingly. The following description primarily concerns a mode of processing games in which the user's action and the image displayed on the display 16 are linked, but the embodiment can be applied to a variety of applications as discussed above.

Figure 2:
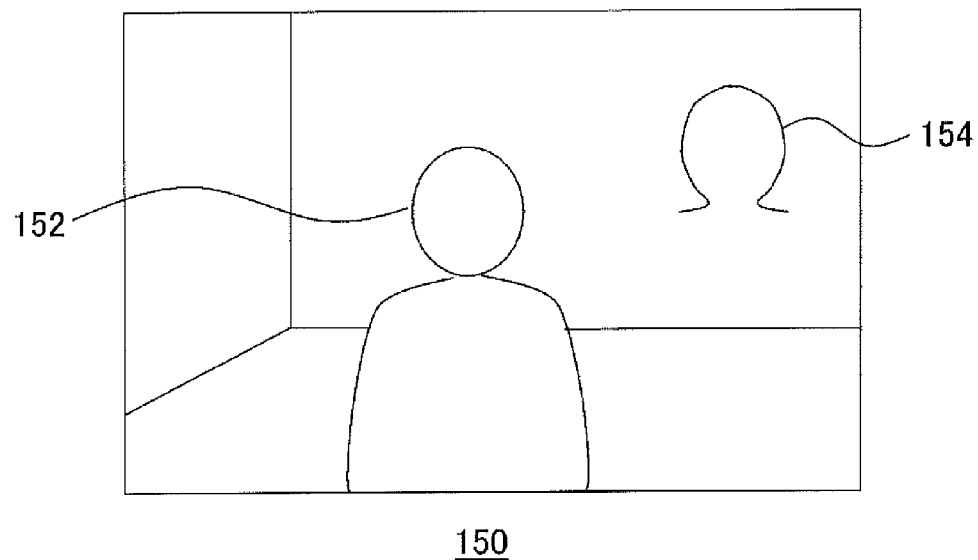
FIG. 2 illustrates a visual tracking method where a person is the target object.

A description will now be given of the principle of detecting an action of the user 18 by the information processing device 14. In this embodiment, a visual tracking process using a particle filter is performed in an image captured by the image capturing device 12 and including the user 18. FIG. 2 illustrates a visual tracking method where a person is the target object. An image 150 of a person is one of the image frames forming a moving image stream and shows a person 152 being the target object. The person 152 corresponds to the user 18 of FIG. 1

In order to track the motion of the person 152, the head and shoulder contours of the person 152 (hereinafter, simply referred to as the head contour) is approximated by a Greek ohm-shaped curve 154 where the Greek ohm-shaped curve 154 is described by a known representation. The image 150 of the person, which shows the person 152, is subjected to an edge extracting process, and an edge image is thereby obtained. The curve 154 is then translated, expanded, contracted, or rotated by changing the parameters defining the curve 154, and edge near the curve 154 is detected so as to obtain the parameters that best match the head contour of the person 152. The above process is repeated for each frame, so that tracking of the person 152 proceeds. In this instance, the edge usually refers to a position at which density or color changes drastically in an image.

The matching score computation of the curves 154 defined by various parameter values and the head contour of the person 152 is implemented by a probability distribution prediction technique using a particle filter. Specifically, the number of the target candidates is reduced by increasing or decreasing the sampling number of the curve 154 according to a probability distribution of the object in the parameter space of the previous image frame. As a result, it becomes possible to focus the search on areas where the existence probability is high, allowing for accurate, efficient matching score computation.

Applications of the particle filter to tracking that focuses on object contours are described in detail in, for example, the non-patent document (ICondensation: Unifying low-level and high-level tracking in a stochastic framework, Michael Isard and Andrew Blake, Proc 5th European Conf. Computer Vision, 1998). The process required to apply such a tracking technique to the present invention is described below.

The Greek ohm-shaped curve 154 is first described by a B-spline curve. The B-spline curve is represented by n control points (Q0, ... Qn) and n knots (s0, ... sn). These parameters are preset to describe a fundamental curve shape, in this instance being a Greek ohm shape. The fundamental curve described by the preset parameters is hereinafter referred to as the template $Q_t$. The shape described by the template $Q_t$ depends on a target object and in the present instance is a Greek ohm shape when the person 152 in the person image 150 shown in FIG. 2 is the target object. For example, when the target object is a ball, the curve to be described has a circular shape; when the target object is a palm, the curve has a palm shape.

Next, a shape-space vector x is given as the transformation parameters for changing the state of the template. The shape-space vector x is represented by six parameters as follows:

$$x = (\text{shift}_x, \text{shift}_y, \text{extend}_x \cos\theta - 1, \text{extend}_y \cos\theta - 1, -\text{extend}_x \sin\theta, \text{extend}_y \sin\theta)^T \quad (1)$$

where ($\text{shift}_x$, $\text{shift}_y$) is a translation amount in (x, y) direction, ($\text{extend}_x$, $\text{extend}_y$) is a magnification, and $\theta$ is a rotation angle. Using the operational matrix W for operating the shape-space vector x on the template $Q_t$, the curve after transformation, i.e., the candidate curve Q, is represented as follows:

$$Q = Wx + Q_t, \quad (2)$$

$$W = \begin{pmatrix} 1 & 0 & Q_t^x & 0 & 0 & Q_t^y \\ 0 & 1 & 0 & Q_t^y & Q_t^x & 0 \end{pmatrix}$$

Expression 2 with the six parameters of the shape-space vector x changed accordingly makes it possible to translate, rotate, expand, and contract the template and combinations of these operations allow the candidate curve Q to change accordingly.

Next, the edges of the person 152 close to the respective knots of multiple candidate curves are detected. The multiple candidate curves are described by the various parameters of the template $Q_t$, such as intervals of the control points and knots, and various sets of the six parameters of the shape-space vector x. Likelihoods of the candidate curves are then calculated from, for example, the distances between the edges and the knots. The probability density distribution in the six-dimensional space defined by the six parameters of the shape-space vector x is estimated based on these likelihoods.

Figure 3:
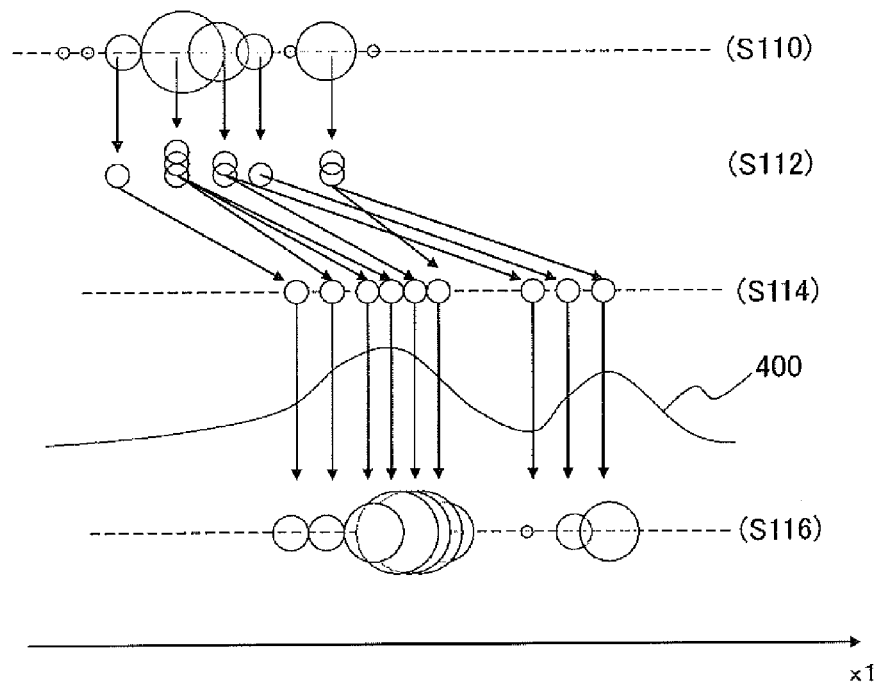
FIG. 3 illustrates a probability density distribution estimation method using a particle filter.

FIG. 3 illustrates a probability density distribution estimation method using a particle filter. In FIG. 2, the horizontal axis shows parameter x1, which is one of the six parameters of the shape-space vector x, to aid understanding of the present invention. However, it should be appreciated that the other parameters are actually processed in the same manner as the parameter x1 in the six-dimensional space. In this instance, consider the example where the image frame whose probability density distribution is to be estimated is at time t.

A probability density distribution in the axis for the parameter x1 is given (S110). This probability density distribution is estimated in the image frame at time t–1, which is one frame previous to the image frame at time t. Particles at time t are then created using the estimated probability density distribution (S112). If there are already particles obtained by filtering, it is determined at this point whether the particles are divided or eliminated. The probability density distribution shown at step S110 is discretely calculated in accordance with the coordinates in the parameter space, and it shows that the larger the circle, the higher the probability density.

The particles are a representation of the sample values of the parameter x1 and the sampling densities. For example, a high probability density region of parameter x1 at time t–1 is described by particles with a high density, so that sampling is focused thereon; a low probability density region is described by particles with a low density, so that the sampling number is small. This allows for efficient matching score computation by creating a large number of the candidate curves near the edge of the person 152, for example.

The particles are then caused to make a transition in the parameter space using a given motion model (S114). The motion model is, for example, a Gaussian motion model, or an autoregression motion model. The Gaussian motion model defines that a probability density at time t around each probability density at time t–1 shows a Gaussian distribution. The autoregression motion model is a technique that assumes an autoregression prediction model for sample data in more than two dimensions; for example, it assumes from changes in the previous parameters that the person 152 moves at a constant speed. With reference to FIG. 2, it is assumed by the autoregression motion model that the parameter x1 moves in the positive direction and the particles are transited accordingly.

The edges of the person 152 close to the candidate curve specified by each particle is searched for using the edge image obtained at time t, the likelihoods of the candidate curves are calculated using the search result, and the probability density distribution at time t is estimated based on these likelihoods (S116). As described above, the estimated probability density distribution discretely shows a true probability density distribution 400, as shown in S116. The probability density distribution at each time is described in the parameter space by repeating the above detailed process. For example, when a probability density distribution is unimodal, in other words, if there is only one target object, a curve estimated to be the contour of the target object is obtained by finally setting, as each parameter, a sum of the parameter values which are weighted with the probability densities.

The probability density distribution $p(x_t^i)$ at time t estimated in S116 is calculated as follows:

$$p(\hat{x}_t^i) = \eta p(y_t|\hat{x}_t^i) \int p(\hat{x}_t^i|\hat{x}_t^i, u_{t-1}) p(\hat{x}_{t-1}^i) d\hat{x}_{t-1}^i \quad (3)$$

where i is a unique particle number, $p(x_t^i|x_t^i, u_{t-1})$ is a given motion model, and $p(y_t|x_t^i)$ is a likelihood. The probability density distribution given by the expression 3 is given for each parameter of a shape-space vector. Therefore, the shape-space vector at each point of time can be estimated by calculating the weighted average of the particles using the probability density distribution.

Meanwhile, a mode as shown in FIG. 1 is hypothesized where an action of the user is captured in an image and used as an input value. The closer an object to be imaged to the image capturing device, the larger the size of the object as imaged, and the farther the object, the smaller the size. It is therefore experimentally shown that the distance between the image capturing device 12 and the user 18 is in proportion to the size of the head contour. The embodiment takes advantage of this property. In other words, the parameters ($\text{extend}_x$, $\text{extend}_y$) forming the shape-space vector are exploited. Variation in these parameters is considered to indicate the amount of user's movement in the direction of depth and is used as an input value. The movement in the vertical and horizontal directions is detected in the form of the parameters (shift$_x$, shift$_y$) forming the shape-space vector and indicating the translation amount.

Where a single-eye camera is used as an image capturing device to detect the user's movement, a captured image only comprises two-dimensional information on the plane. Therefore, it is difficult to detect the movement of the user in the depth direction. Variation in the area of a facial region detected by a face recognition technology may be used to acquire depth information from two-dimensional information. The area of a facial region tends to vary irrespective of the distance in depth, depending on the orientation of the face or how the hair hangs over the face. Therefore, such a method may not produce sufficient precision.

According to the above method, the movement in the direction of depth is detected by comparing the areas of facial regions in a plurality of still images captured intermittently. In this approach, however, various changes in the environment such as the presence of a plurality of people in the imaged range or the crossing of something in front of the camera will also be captured as a result of detection. It is therefore difficult to detect only the action of the target person.

In this embodiment, the head contour of the user is sequentially tracked. Generally, the size of a head contour hardly changes even if the orientation of the face or hair changes. For this reason, the position in the depth direction is known without being affected by variation in the user himself or herself, by using the size of the head contour as a parameter. Since the heat contour is tracked continuously (e.g., frame by frame), it is easy to extract the movement of the target user accurately, in isolation from another person or an object located in the imaged range. As such, the embodiment is resistive to the surrounding environment. Further, the embodiment can track target persons in distinction from each other and so can perform processes adapted to the action of individual users without confusing targets even when a plurality of users are involved in a game and so on.

Figure 4:
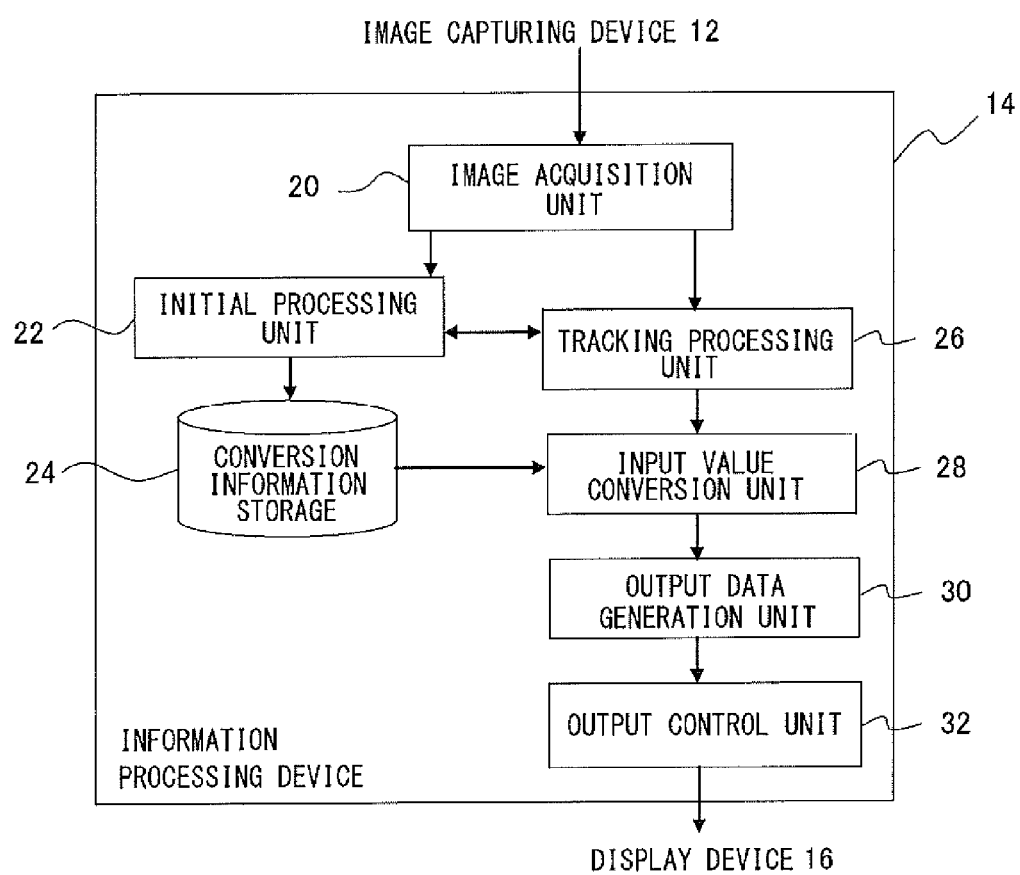
FIG. 4 shows the configuration of the information processing device according to the embodiment in detail.

FIG. 4 shows the configuration of the information processing device 14 in detail. The information processing device 14 comprises an image acquisition unit 20 configured to acquire image data input from the image capturing device 12, an initial processing unit 22 configured to map the actual movement of the user with the movement of the image linked with the user's movement, a tracking processing unit 26 configured to perform the aforementioned visual tracking process, an input value conversion unit 28 configured to convert parameters such as magnification and translation amount obtained as a result of tracking into parameters defining the movement of an image (hereinafter, referred to as "image defining parameters"), an output data generation unit 30 configured to generate new image data using the image defining parameters, and an output control unit 32 configured to control the output of the generated image data to the display 16.

Figure 5:
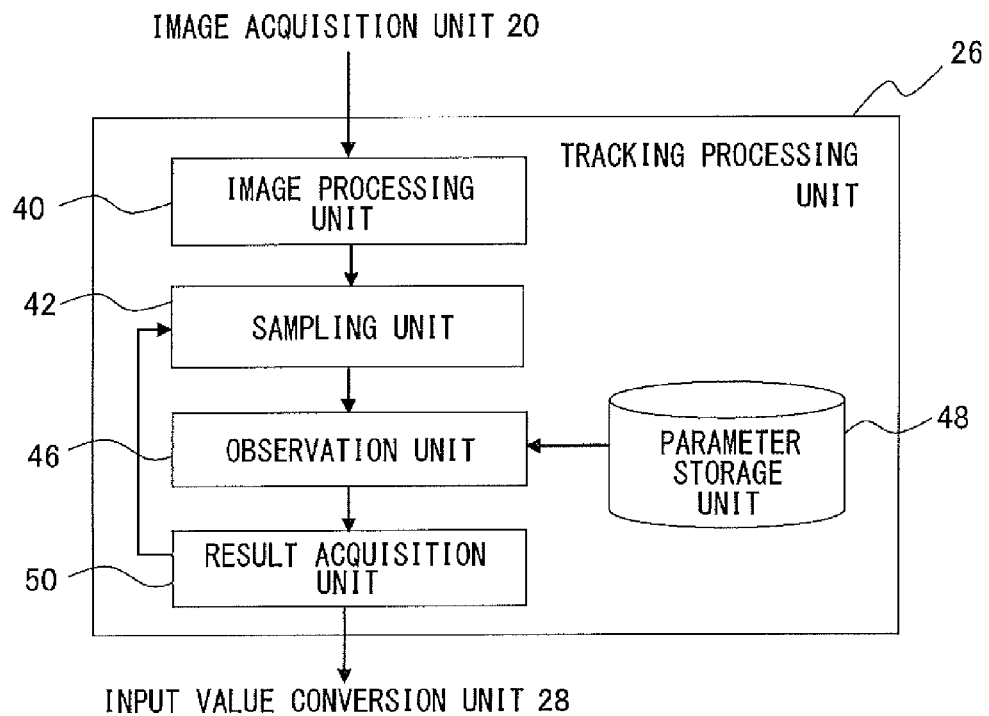
FIG. 5 shows the configuration of the tracking processing unit according to the embodiment in detail.
Figure 6:
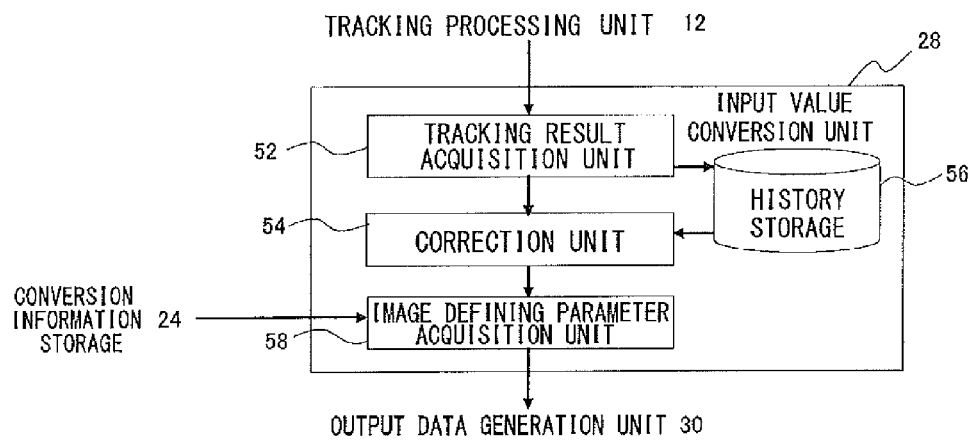
FIG. 6 shows the configuration of the input value conversion unit according to the embodiment in detail.

In FIGS. 4, 5, and 6, the components described as functional blocks which perform various processes are provided by hardware such as CPU, memory, and other LSI, or by software such as image processing programs and the like. Therefore, it will be obvious to those skilled in the art that the functional blocks may be implemented in a variety of manners by a combination of hardware and software.

In the case of games designed to display images linked to the movement of the user, the output data generation unit 30 generates the image data as designed. As mentioned above, the embodiment is applied to various applications. Therefore, the output data generation unit 30 may not only generate image data but also perform a process adapted to the application. Accordingly, the input value conversion unit 28 may convert a parameter obtained as a result of tracking into a function ID of an application mapped to the parameter so that the output data generation unit 30 performs a process that implements the function corresponding to the function ID.

The image acquisition unit 20 acquires an image of the user from the image capturing device 12 by cable or wirelessly. The initial processing unit 22 performs calibration whereby the amplitude of a parameter in the shape-space vector obtained as a result of tracking as the user makes a move of the maximum amount is mapped to the possible amplitude of the image defining parameter. More specifically, the amplitude of a parameter is obtained by causing the user to stand at a position of maximum movement to capture the user's image and by acquiring the parameter in the shape-space vector space then occurring. Correspondence is established so that the maximum value or the minimum value of the parameters, including the magnification and the translation amount, matches the maximum value or the minimum value of the possible range of the image defining parameter. Correspondence of values other than the maximum value and the minimum value may be established in different ways depending on, for example, game content. The details will be discussed later. Data indicating the correspondence thus established is stored in the conversion information storage 24.

The tracking processing unit 26 tracks the movement of the user using the above-mentioned visual tracking method. In the following description, it is assumed that the head contour of the user is tracked, but the target of tracking in this embodiment may not necessarily be the head. It is however desirable for the reason described above that the object tracked be such that the apparent shape as viewed from the image capturing device does not change or is less likely to change, even when the angle with respect to the image capturing device 12 changes as a result of movement. For example, the same result as obtained in the case of the head will be obtained by causing the user to hold a rod (handle) with a ball on top and tracking the ball accordingly.

The input value conversion unit 28 acquires the image defining parameter at each point of time by referring to the data indicating the correspondence and stored in the conversion information storage 24, using the magnification and the translation amount at each point of time obtained as a result of tracking in the tracking processing unit 26 as keys. The output data generation unit 30 refers to the image defining parameter acquired by the input value conversion unit 28 and generates new image data so that the displayed image changes according to the user's movement. The generated image is displayed on the display 16 under the control of the output control unit 32.

FIG. 5 shows the configuration of the tracking processing unit in detail. The tracking processing unit 26 comprises an image processing unit 40 configured to generate an edge image from input image data, a sampling unit 42 configured to perform sampling in the parameter space by creating and eliminating particles, an observation unit 46 configured to observe the likelihood of a candidate curve defined by each particle, a result acquisition unit 50 configured to integrate the results of observation and estimate a shape-space vector, and a parameter storage unit 48 configured to store a parameter defining a Greek ohm-shaped template. For detection of the body position or action of the user, the template may be Greek ohm-shaped and the contour of the head is tracked accordingly. However, the shape of a template may be otherwise. The template shape may differ depending on the target to be imaged. For example, the template may have the shape of a palm when only the hand of the user is imaged so that the process is performed according to the position or action of the hand.

The image processing unit 40 performs an edge extracting process on each image frame of the input image data to generate edge images. A typical edge extracting algorithm, such as the Canny edge filter or the Sobel filter, may be used in the edge extracting process. The image processing unit 40 may perform preprocess prior to the edge extracting process, in order to efficiently extract the edges of the target object. For example, the image processing unit 22 includes a foreground extractor (not shown) that uses background subtraction, thereby extracting foreground objects including the target object from the input image.

The sampling unit 42 creates and eliminates particles based on the probability density distribution in the space defined by shape-space vectors x, which is estimated for the image frame at the previous time t−1. The particles are then made to undergo a transition in the space by applying a given motion model to all the particles.

The observation unit 46 observes the likelihood of the candidate curve defined by each particle that is generated, eliminated, and transited by the sampling unit 42. The likelihood is determined by searching for edges in the neighborhood of the candidate curves in the edge image generated by the image processing unit 40 and estimating distances to the edges for the respective candidate curves. As described above, the candidate curve is obtained by applying the parameters defining each particle to a Greek ohm-shaped template read from the parameter storage unit 48. The result acquisition unit 50 computes, in the space defined by shape-space vectors x, the probability density distribution given by expression 3 based on the observed likelihood from the observation unit 46, and computes the weighted average of the parameters accordingly. The data is returned to the sampling unit 42 in order to use it in a tracking process at time t+1.

If there are a plurality of target objects, the result acquisition unit 50 tracks the targets using templates specific to respective targets. The result acquisition unit 50 also detects an overlap of the target objects and eliminates one from behind another at a certain time in terms of the tracking process. Accordingly, even when a current target object hides behind another target object, and thus its observation likelihood temporarily goes down, it is possible to prevent the output of an incorrect tracking result.

FIG. 6 shows the configuration of the input value conversion unit 28 in detail. The input value conversion unit 28 comprises a tracking result acquisition unit 52 configured to acquire the parameters in the shape-space vector obtained as a result of visual tracking, a correction unit configured to perform correction to ensure accuracy before converting the acquired parameters into image defining parameters, and an image defining parameter acquisition unit 58 configured to convert the parameters in the shape-space vector into image defining parameters. Of the parameters in the shape-space vector acquired as a result of tracking in the tracking processing unit 26 and occurring at a point of time t, the tracking result acquisition unit 52 acquires a value (extend$_x$, extend$_y$) indicated the magnification and a value (shift$_x$, shift$_y$) indicating the translation amount. The acquired value is stored in the history storage 56.

The correction unit 54 acquires, from the history storage 56, the time-dependent change in the magnification and the translation amount occurring up to that point of time. The correction unit 54 corrects the magnification and the translation amount at time t by using the acquired data to perform noise-removing filtering such as median filtering or the least square method. More specifically, data indicating abrupt change that cannot be considered to indicate actual movement is removed based on the criteria derived from the past time-dependent change, or the true value is estimated in consideration of a tracking error. Methods generally used in statistics can be used to remove extreme data or estimate true values by referring to history data.

According to this embodiment, shape-space vectors can be acquired frame by frame, for example. Therefore, time-dependent change in the parameters is known in detail. By using the time-dependent change for correction, the reliability of parameters such as magnification or translation amount, and, ultimately, the reliability of image defining parameters can be improved. In a mode where the user's movement is reflected in the image, images showing smooth movement can be displayed by eliminating high-frequency components.

Figure 7:
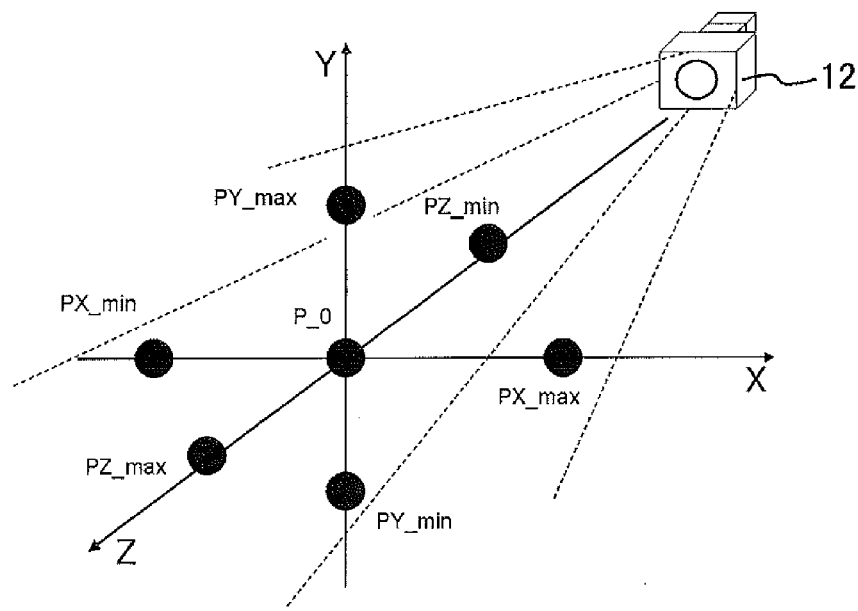
FIG. 7 shows the position of the head as the user is imaged for calibration performed by the initial processing unit according to the embodiment.

The image defining parameter acquisition unit 58 acquires the image defining parameters at time t by referring to data indicating correspondence and stored in the conversion information storage 24, using the corrected parameters in the shape-space vector as keys. A description will now be given of correspondence between the parameters in the shape-space vector and the image defining parameters. FIG. 7 shows the position of the head as the user is imaged for calibration performed by the initial processing unit 22 in order to define the correspondence.

The X-coordinate axis, Y-coordinate axis, and the Z-coordinate axis in the figure represent the horizontal, vertical, and depth directions, respectively. For calibration, the user is caused to stand at a position that serves as a reference to generate inputs responsive to the movement therefrom. Hereinafter, the position will be referred to as "reference position". The reference position may be designated by the device as being located at a certain distance (e.g., 1 m) from the image capturing device 12. The distance from the image capturing device 12 is used to correct the movement in the horizontal and vertical directions as described below. The distance may be defined by the user as desired if the correction is not performed. When the user stands at the reference position, the image capturing device 12 captures an image of the user 18 and the tracking processing unit 26 acquires the magnification and the translation amount in that state.

The value acquired in this state is a value obtained as a weighted average of the parameters defining a particle, using the calculated probability density distribution. Since this is an initial process, an area estimated to capture the user may be derived by referring to, for example, an edge image so that particles are dispersed at equal intervals in that area for observation. Alternatively, a matching score between a template and the edge image may simply be computed. FIG. 7 shows the head as being located at the point of origin P_0.

Subsequently, the user is caused to stand at positions removed from the reference position by one step forward and backward so that the values of magnification there are acquired. FIG. 7 shows the head as being located at the coordinates PZ_min, PZ_max. The user is then caused to stand at positions removed from the reference position by one step leftward and rightward so that the translation amounts there are acquired. FIG. 7 shows the head as being located at the coordinates PX_min, PX_max. Similarly, the user is caused to bend and stretch the body at the reference position so that the translation amounts then occurring are acquired. FIG. 7 shows the head as being located at the coordinates PY_min, PY_max.

The movement by one step is by way of example only. For example, calibration such as this may be used in, for example, a game of cave expedition designed to display a visual field in which the user advances into a cave as he or she moves one step forward from the reference position and in which the user continues to recede from the cave as he or she moves one step backward from the reference position. Thus, the positions of calibration may be changed depending on the setting in the application (e.g., a game). For example, in an application where the maximum amount of movement is three steps and the moving speed in the displayed virtual space is continuously changed depending on the distance from the reference position, calibration is performed by causing the user to move three steps forward, backward, leftward, and rightward from the reference position. It is desirable, however, that the position where the user is caused to stand is within the angle of field of the image capturing device 12.

In other words, the values of magnification and translation amount are acquired at both ends in the depth direction (Z-axis) and the horizontal direction (X-axis) in the user's range of movement. The same is true of the vertical direction (Y-axis). The value of the translation amount is acquired at the highest and lowest positions in the range of movement of the head in the vertical direction. Actions like "stretch" and "bend" are by way of example. Calibration such as this may be used to display images that allow the user to enjoy a virtual experience such as stretching the body so as to look over a fence or bending to avoid something. The range of movement may differ depending on the application.

In the above-described method of calibration, the user moves in his or her stride or take a certain posture so that the magnification or the translation amount occurring at that point of time is acquired. In this way, it is ensured that the same type of action triggers the display of the image as intended irrespective of the difference in facial sizes, length of strides, height, etc. between users. Meanwhile, for some applications, the maximum amplitude of the magnification or the translation amount may be designated by the device so that the user moves in adaptation to the designated value. In this case, a mirror image of the image capturing the user is displayed on the display 16 in realtime at the time of calibration. Template images are superimposed at a total of six points (PX_min, PX_max, PY_min, PY_max, PZ_min, PZ_max) at the X-axis, Y-axis, and Z-axis ends of the range of movement permitted by the device.

The user is caused to recognize the approximate range where the movement is permitted by allowing the user to move so as to align the head contour with the shape of the six templates displayed. In this case, the maximum amplitude of the magnification or the translation amount is substantially identical irrespective of individual differences or changes in the environment. Therefore, the device or the application may maintain stationary correspondence between the magnification or the translation parameter and the image defining parameter.

Figure 8:
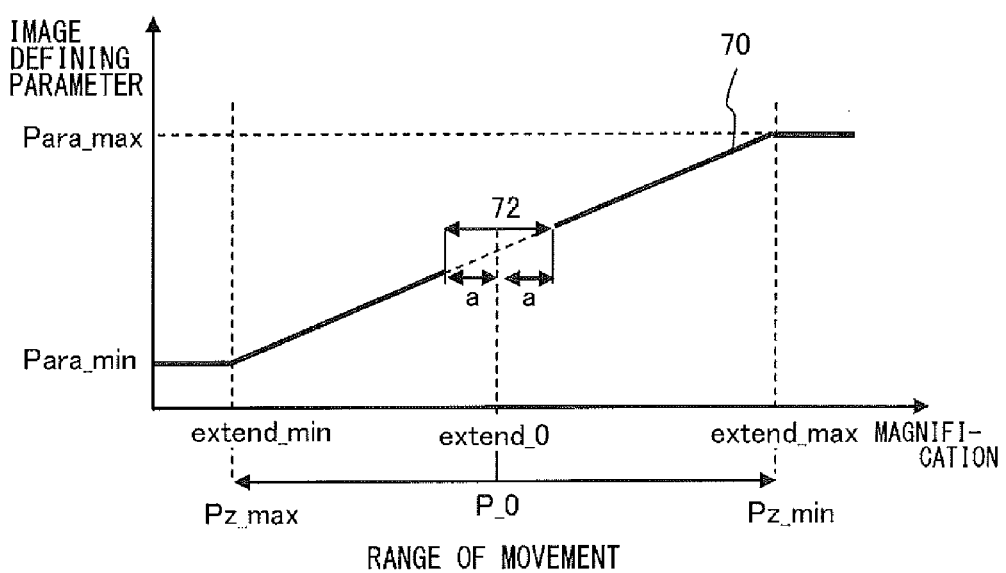
FIG. 8 schematically shows correspondence between the movement of the user in the depth direction and an image defining parameter.

FIG. 8 schematically shows correspondence between the movement of the user in the depth direction and an image defining parameter. The horizontal axis of FIG. 8 represents the magnification. The minimum value of the magnification in the range of movement is denoted by "extend_min" and the maximum value by "extend_max". The magnification is actually represented in a two-dimensional format using the X-axis and the Y-axis, as described above, but an average of the X and Y components or one of the X and Y components represents the magnification shown in FIG. 8 and is mapped to the image defining parameter. That the magnification is at the minimum value "extend_min" means that the user is located at the position farthest from the image capturing device 12 within the range of movement. In other words, it means that the user is located at the position PZ_max. Conversely, that the magnification is at the maximum value "extend_max" means that the user is located at the position closest to the image capturing device 12. In other words, it means that the user is located at PZ_min.

As indicated by the horizontal axis of the figure, the magnification of the head contour is in proportion to the distance to the image capturing device. Therefore, the magnification can be directly translated into the position in the depth direction so that the interval between Pz_min and Pz_max represents the range of user's movement. Correspondence 70 for converting the range of user's movement, i.e., the range where the magnification varies, into the range of variation of the image defining parameter is thus established. The term "range of movement" may mean a range where the image is linked to the user's movement. In practice, however, the user may move beyond Pz_mix/Pz_max.

As shown in the figure, the extremities of the correspondence 70 are defined such that the minimum value "Para_min" of the image defining parameter occurs when the magnification within the range of movement is at the minimum value "extend_min" and such that the maximum value "Para_max" of the image defining parameter occurs when the magnification is at the maximum value "extend_max". Correspondence is established so that a value of the image defining parameter within the variable range is derived from a value of magnification. Whether the minimum value "extend_min" or the maximum value "extend_max" of the magnification is mapped to the maximum value "Para_max" or the minimum value "Para_min" of the image defining parameter may vary depending on the application or the image defining parameter.

The illustrated example addresses the user's movement outside the "range of movement" such that the maximum value "Para_max" of the image defining parameter is maintained when the user is closer to the image capturing device than Pz_min, and the minimum value "Para_min" of the image defining parameter is maintained when the user is farther than Pz_max.

As described above, the minimum value "extend_min" and the maximum value "extend_max" of the magnification may be acquired by calibration, allowing for the stride of the user. Alternatively, the user may be allowed to learn a predefined range of movement. In the former case, the initial processing unit 22 acquires the minimum value "extend_min" and the maximum value "extend_max" of the magnification and then defines the correspondence 70 according to a predefined rule. In the latter case, the correspondence 70 is preset in, for example, an application program.

The rule for establishing the correspondence between the magnification and the image defining parameter may vary depending on the application or the user's environment except that the ends of the variable range of the image defining parameter should be aligned with the ends of the range in which the magnification varies. FIG. 8 shows that the image defining parameter varies linearly with respect to the magnification. However, the correspondence 70 in the figure is provided with an area 72 with an extent of 2a centered around the magnification "extend_0" corresponding to the reference position P_0, where the image defining parameter does not change even if the magnification changes. This is to address the likelihood that the magnification may change due to slight head movement that could actually occur or an error in computing the magnification, even if the user has not moved from the reference position.

The area 72 may be provided as an insensitive zone so that the image defining parameter, and, ultimately, the displayed image does not react excessively due to fluctuation not intended by the user. Those portions of the correspondence 70 other than the insensitive zone may not be linear in shape. For example, variation in the portions outside the insensitive zone may be in accordance with a quadratic function or a cubic function or may be discontinuous. When an insensitive zone is not provided in FIG. 8, the image is linked to the movement over the entirety of the range of movement, including the portion in the correspondence 70 indicated by a dotted line.

For example, given a game mode in which the user standing at a position one step forward continues to advance in the virtual world as displayed, and given that the image defining parameter is an "advancing speed", discontinuity occurs such that the value of the advancing speed is 0 when "extend_0"≤magnification<"extend_max", and that the user advances at a certain advancing speed when the magnification is "extend_max". The same argument holds true of a case where an item in a menu is selected according to the user's position. Continuity may be established such that numerical values are given only at characteristic positions and interpolation in the coordinate system as shown in FIG. 8 is performed to define the correspondence in the other portions.

In the aforementioned example, the magnification levels occurring at the ends of the "range of movement", in which the user's movement is linked to the image, are mapped to the ends of the variable range of the image defining parameter. Alternatively, the ends may not necessarily be mapped to each other. In other words, the user may be caused to stand at two positions displaced from each other by several steps so as to acquire the magnification of the head contour. The acquired magnification and the image defining parameter may then be mapped to each other so that the image is moved by an amount commensurate with the steps. When the two positions are referred to as PZ_a and Pz_b, the correspondence 70 in FIG. 8 is defined by ensuring that PZ_min≤PZ_a≤PZ_b≤PZ_max.

The range of movement, in which the movement is linked to the image, need not be defined, i.e., PZ_min or Pz_max may not be defined, depending on the application or the displayed image. In this case, too, the correspondence 70 is defined by determining the correspondence between the magnification occurring at two positions and the image defining parameter as described above, and by linking the plots by a linear function or a certain other function. The image may be allowed to change appropriately in accordance with the movement in the depth direction, within a range in which the user is captured by the image capturing device 12.

FIG. 8 shows correspondence used to convert variation in the user's position in the depth direction into the image defining parameter, using the magnification as a parameter. The same is true of the user's movement in the horizontal direction and in the vertical direction. By similarly establishing the correspondence between the translation amount and the image defining parameter, the movement is converted into the image defining parameter, using the translation amount as a parameter. It should noted, however, the relation between the actual movement of the user in the vertical direction or the horizontal direction and the apparent amount of movement as viewed from the image capturing device 12 depends on the distance between the image capturing device 12 and the user. According to this embodiment, the amount of movement from the reference position in the depth direction is known by the magnification. The magnification is therefore used to correct the translation amount, which indicates the apparent amount of movement, so as to estimate the actual amount of movement of the user.

Figure 9:
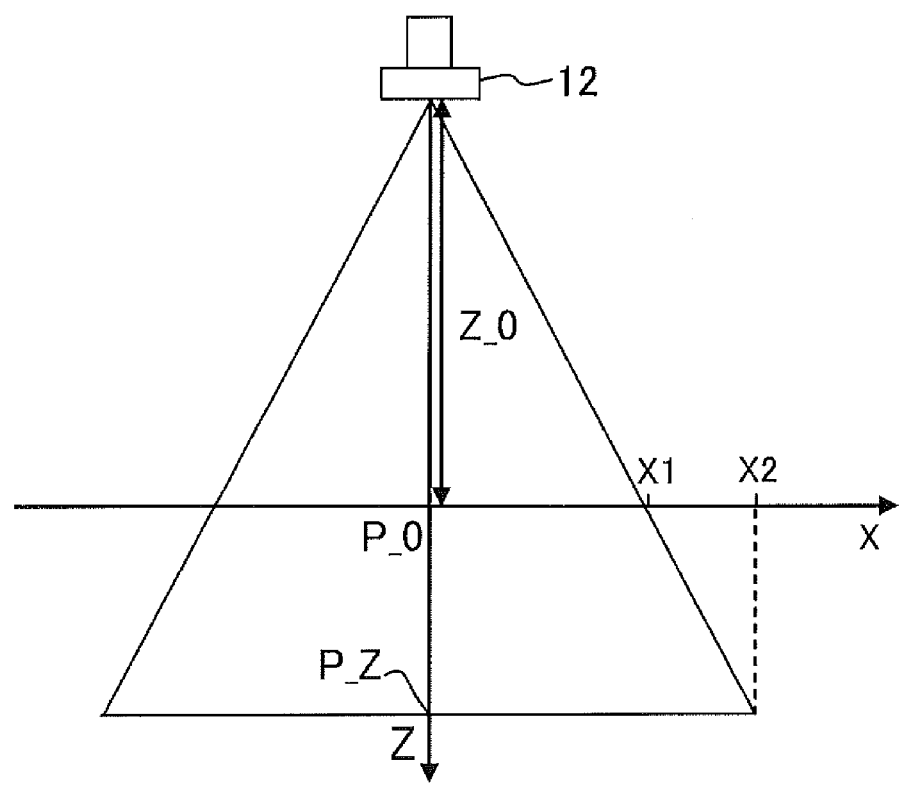
FIG. 9 shows a principle according to the embodiment of correcting the translation amount, which indicates the apparent amount of movement.

FIG. 9 shows a principle of correcting the translation amount, which indicates the apparent amount of movement. The horizontal axis (X-axis) in the figure represents the horizontal direction and the vertical axis (Z-axis) represents the depth direction. The image capturing device 12 is located on the Z-axis. The intersection between the X-axis and the Z-axis represents the reference position P_0. The distance from the image capturing device 12 to the reference position is denoted by Z_0. Comparing the horizontal movement of the user at P_Z, which is farther away from the image capturing device 12 than the reference position P_0, with the same amount of movement at the reference position P_0, the former movement appears to be smaller as viewed from the image capturing device 12. When the user is closer to the image capturing device 12 than the reference position, the opposite is the case. The same argument is true of the vertical direction. The apparent amount of movement, i.e., the amount of variation in the translation amount, is converted into the amount of movement occurring at the reference position in the depth direction so that the image defining parameter is acquired from the movement in the horizontal direction or the vertical direction wherever the user is in the depth direction.

Assuming that the user located at the position P_Z in the depth direction moves a distance of X2 in the horizontal direction, the amount of movement as converted is given by multiplying the amount of variation in the translation amount by X2/X1=(Z_0+(P_Z−P_0))/Z_0. The distance (P_Z−P_0) from the reference position in the depth direction can be converted from the magnification with the result that the amount of movement in the horizontal direction or the vertical direction can ultimately be corrected by the magnification. The correspondence similar to that shown in FIG. 8 is referred to after the correction so that the value of the image defining parameter mapped to the movement is acquired. The method of correction described herein is by way of example only. In practice, any of various correction methods may be defined depending on, for example, the content of application.

Figure 10:
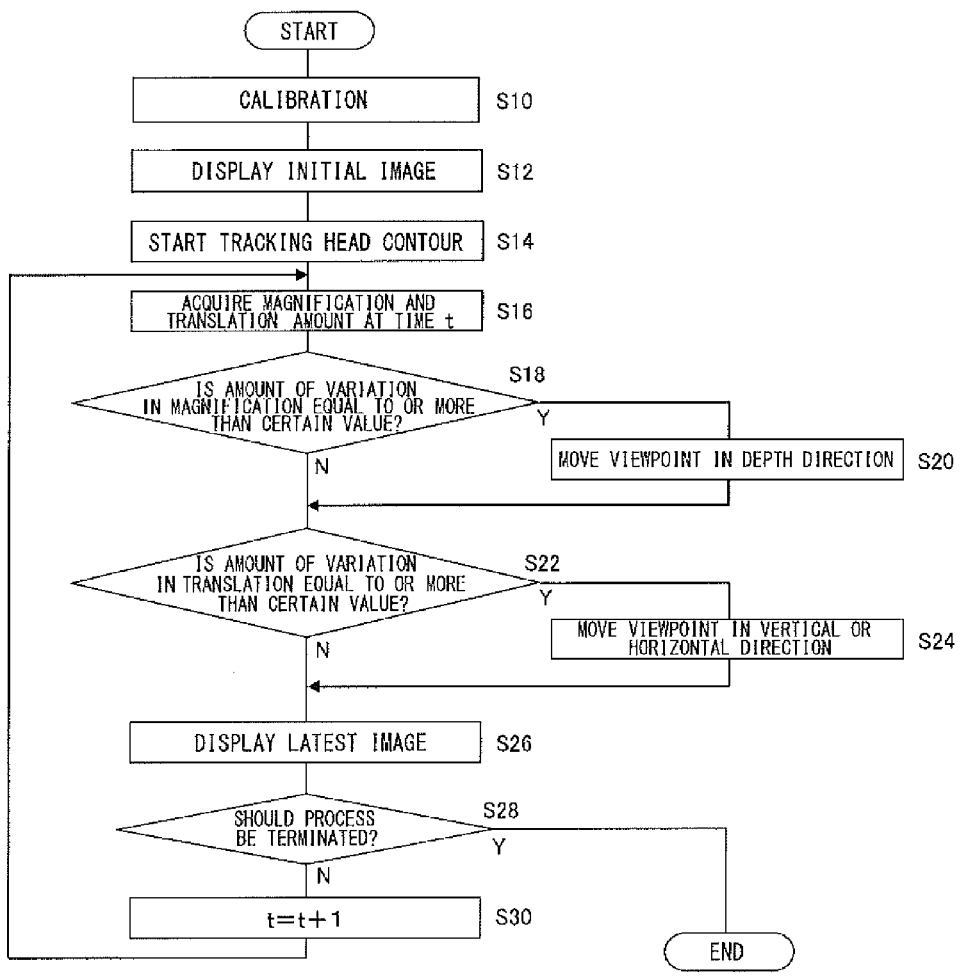
FIG. 10 is a flowchart showing the processing procedure performed by the information processing device according to the embodiment.

A description will now be given of the operation implemented by the configuration described above. FIG. 10 is a flowchart showing the processing procedure performed by the information processing device 14. In this case, a game of a mode where the field of view of a user in a virtual world is displayed in an image will be discussed by way of example. It is ensured that, as the user moves in the depth direction, the viewpoint is moved in the depth direction, and, as the user moves in the vertical or horizontal direction, the viewpoint is moved in the vertical or horizontal direction in association with the movement. Therefore, the image defining parameter could be a viewpoint coordinate.

When the user starts the software of the game, the initial processing unit 22 initiates calibration (S12). For example, an instruction regarding the stand position may be displayed on the display 16, prompting the user to stand at a predetermined position or take a posture. Then image matching between the head contour at the position and a template used in the tracking process is performed so as to acquire the magnification and the translation amount. As described above, variation in the magnification and the translation amount due to the movement in each direction is then mapped to the image defining parameter. An expression or a table representing the correspondence is stored in the conversion information storage 24.

The initial processing unit 22 further displays the initial image of the game, i.e., the first field of view in the virtual world, on the display 16 (S12). The tracking processing unit 26 sequentially reads the image captured by the image capturing device 12 and starts visual tracking of the head contour (S14). The input value conversion unit 28 acquires the magnification and the translation amount of the head contour at current time t, as a result of the tracking process (S16). In this process, the input value conversion unit 28 causes the history storage 56 to store the data. In the subsequent frames, the magnification and the translation amount acquired in S16 are corrected in accordance with the history stored, as described above.

The input value conversion unit 28 refers to the data indicating the correspondence and stored in the conversion information storage unit 24 and determines whether the variation in the magnification amount from that corresponding to the reference position is equal to or more than a certain value (S18). The term "certain value" corresponds to "a" in FIG. 8. S18 verifies whether variation in the magnification is equal to or more than the value defined for the insensitive zone. The value of "a" may be defined as appropriate in the application or the device. When the amount of change in the magnification is equal to or more than a certain value (Y in S18), the viewpoint in the depth direction (included in the image defining parameter) is moved (S20). The amount of movement is acquired from the data indicating the correspondence and stored in the conversion information storage unit 24. When the amount of change in the magnification is in the insensitive zone (N in S18), the viewpoint in the depth direction is not moved, as described above.

Similarly, when the variation of the translation amount at time t from that corresponding to the reference position is equal to or more than a certain value (Y in S22), the viewpoint is moved in the corresponding direction (S24). In this process, when the user is moved in the depth direction from the reference position (Y in S18), the amount of movement of the viewpoint is determined after correcting the translation amount using the magnification (not shown), as described above. When the variation of the translation amount in a direction is in the insensitive zone (N in S22), the viewpoint in that direction is not moved. The output data generation unit 30 generates image data as viewed from the viewpoint thus moved, and the output control unit 32 controls the display 16 to display the latest image (S26).

When the magnification and the translation amount are in the insensitive zone, the viewpoint of the image does not change. The flowchart of FIG. 10 only shows the process of moving the viewpoint in response to the movement of the user and omits the other processes from the illustration. Alternatively, the latest image displayed in S26 may be animated (e.g., an object in the image is moved) even when the viewpoint is not be changed. When it is not necessary to terminate the process for the reason that the game is over or that the user provides a command to end the game (N in S28), the steps from S16 to S26 are repeated, using time t+1 of the next frame as the current time t (S30). When it is necessary to terminate the process (Y in S28), the process is terminated.

Figure 11:
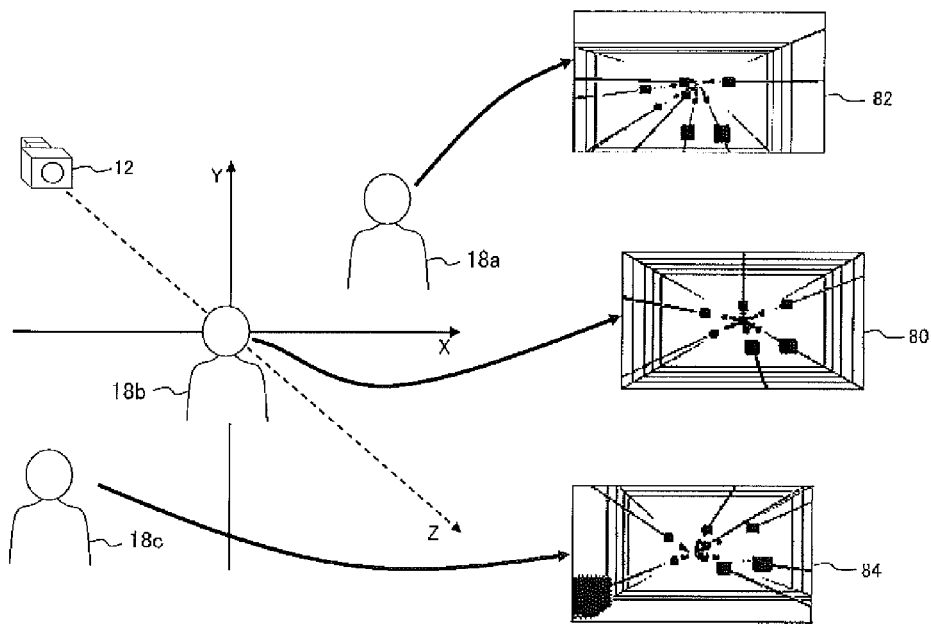
FIG. 11 shows how an image displayed on the display varies with respect to the user's position in a game subject to the process of the flowchart of FIG. 10.
Figure 12:
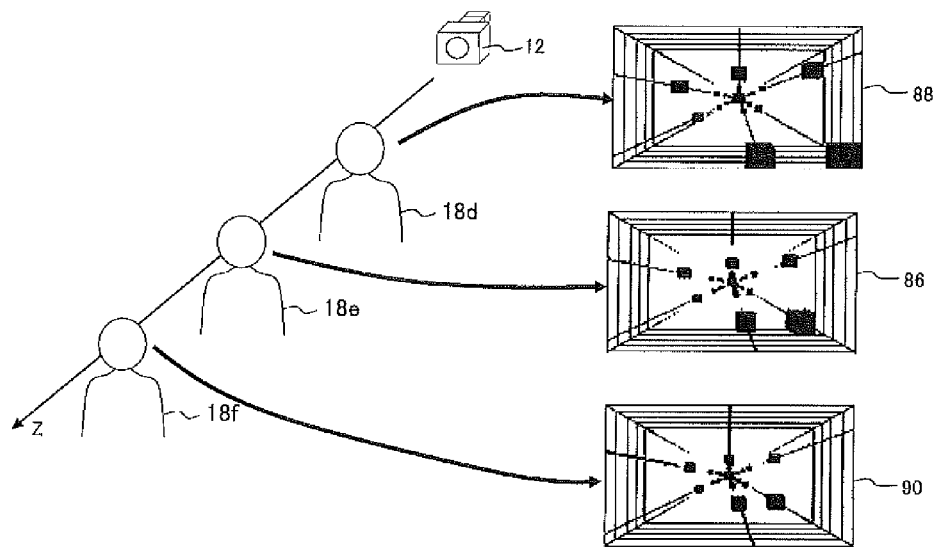
FIG. 12 shows how an image displayed on the display varies with respect to the user's position in a game subject to the process of the flowchart of FIG. 10.

FIGS. 11 and 12 shows how an image displayed on the display 16 varies with respect to the user's position in a game subject to the process of the flowchart of FIG. 10. These figures show representative positions of the user and exemplary images displayed at the respective positions, using arrows to indicated correspondence. The images are shown such that several cubes are floating motionlessly. In FIG. 11, the positional coordinates of the user are defined in the vertical and horizontal directions (X-axis and Y-axis). The point of origin is defined as the reference position. An image 80 is displayed while the user is at the reference position (user 18b). When the head contour is located toward right and above the reference position as the user moves right and stretches his or her body (user 18a), for example, an image like an image 82, showing a scene of cubes as viewed from above and from right, is displayed. When the head contour is located toward left and below the reference position as the user moves left and bends his or her body (user 18c), an image like an image 84, showing a scene of cubes as viewed from below and from left, is displayed.

In FIG. 12, the positional coordinates of the user are defined in the depth direction (Z-axis). An image 86 is displayed while the user is at the reference position (use 18e). When the user approaches the image capturing device 12 (user 18d), an image like an image 88, showing that the user approaches a scene of cubes, is displayed. When the user moves away from the image capturing device 12 (user 18f), an image like an image 90, showing the user moves away from a scene of cubes, is displayed. As mentioned above, the viewpoint of the image may continuously be moved while the user is at a position other than the reference position.

According to the embodiment described above, the image capturing device is used to capture an image of the user and detect the movement of the user in directions including the depth direction. The detected movement is used as input information in subsequent processing. By sensing variation in the depth direction as well as variation on a plane, variation of input values is increased so that the system can easily adapt to applications having a complex input system. As a result, as compared with input means such as controllers or keyboards, the user can provide inputs in a more intuitive and user-friendly fashion using his or her body, while maintaining the number of items that can be input. Since the user's body is used, the user can make the most out of the game and can enjoy a virtual world in a more natural fashion in games where virtual worlds of various categories (role playing, shooting, sports) are built.

For detection of the user's movement, the magnification and the translation amount determined by tracking the head contour are used. These parameters can be acquired at quite small time intervals (e.g., frame by frame). Therefore, the head of a single user can be identified with high precision even if the environment around the user changes while the application like a game is being run. The shape of the head contour is hardly affected by the orientation of the face or how the hair hangs over the face. As such, detection of the shape of the head contour is reliable in comparison with face recognition. As a result, applications can be produced that are resistant to variation in the user himself or herself or the surrounding situation.

Further, the movement in the vertical and horizontal directions with respect to the image capturing device is corrected by the magnification. This ensures that the same movement in the vertical or horizontal direction produces the same movement of the image wherever the user is in the depth direction, thereby achieving image presentation that the user can relate to with ease. The approach according to the embodiment does not require the user to change the movement depending on the distance from the image capturing device or does not induce a drop in the precision of detection of the amount of movement, even in a simple situation where an item is selected from a menu. As a result, a variety of parameters can be input easily only by using the body motion.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In this embodiment, the magnification obtained as a result of visual tracking is converted into the image defining parameter by using the linearity of the relation between variation in the magnification and the amount of movement in the depth direction. Alternatively, the magnification may not be used to estimate the amount of movement in the depth direction. For example, the shape of the head contour, which can be estimated as a result of visual tracking, may be used. In this case, the number of pixels inside the obtained Greek ohm-shape of the head contour is counted. The apparent size of the head is represented by the counted number and the amount of movement in the depth direction is estimated accordingly.

In this case, the contour line acquired is an estimated value produced by weighted averaging and is represented by a B-spline curve comprising limited control points. Therefore, the acquired contour line may not perfectly match the contour of the user's head. In this regard, a matching score between the contour line initially obtained by weighted averaging and the edge image may be computed again and the contour line is made to fit the user's head contour, before counting the number of pixels inside. With this approach, the movement in the depth direction can be detected with precision.

Furthermore, the area where the user is located may be acquired by other means. For example, the system may be provided with a temperature sensor that measures the heat distribution of the space, in addition to the image capturing device. Alternatively, a foreground extractor may be used for background subtraction. In this case, the contour line obtained as a result of tracking or the contour line made to fit the actual head contour as described above may be compared with the head area acquired by other means so that the contour line is further corrected. Known technologies can be applied to acquire an area of an object using a temperature sensor or a foreground extractor. Similarly, a face recognition process may be performed along with tracking of the head contour. For example, face recognition is performed in an area inside the estimated head contour so that the contour is corrected, or parameters such as magnification are corrected. In any of these cases, the movement in the depth direction can be detected with precision.

The description of the embodiment assumes a mode in which the movement of a single user is detected. Alternatively, the movement of a plurality of users may be detected. Applying the embodiment to games that do not involve the movement in the depth direction will improve the precision with which to detect the movement. For example, the movement of the user's head in the vertical and horizontal directions may be linked to the movement of an avatar, i.e., a virtual user in the image, in games where a plurality of users play at the same time (e.g., tennis doubles games, role playing games where players are expected to cooperate with each other, fighting games, and shooting games). In this case, the head contour of each user is tracked and the amount of movement is detected accordingly.

As described in the embodiment, the relation between the actual movement and the apparent amount of movement varies depending on the stand position of the user in the depth direction. Accordingly, the apparent amount of movement is corrected using the magnification of the head of each user, translating the apparent movement into the movement at a position in the depth direction where one of the users stands. This can ensure that the same action produces an image reacting in the same manner even when a plurality of users stand at different positions in the depth direction. As a result, natural user interface is produced.

Correspondence between the parameter in the shape-space vector and the image defining parameter may differ depending on the user. By, for example, preventing extra corrections from being performed depending on the difference in the size of users' heads, the precision of detecting the movement is further improved. A face recognition process may be performed in the head area obtained as a result of tracking in order to recognize individual users so that the correspondence is switched once the user is identified.

DESCRIPTION OF THE REFERENCE NUMERALS

10 information processing system, 12 image capturing device, 14 information processing device, 16 display device, 20 image acquisition unit, 22 initial processing unit, 24 conversion information storage unit, 26 tracking processing unit, 28 input value conversion unit, 30 output data generation unit, 32 output control unit, 40 image processing unit, 42 sampling unit, 46 observation unit, 50 result acquisition unit, 52 tracking result acquisition unit, 54 correction unit, 56 history storage As described, the present invention can be applied to information processing devices such as computers, game devices, and image processing device.

The invention claimed is:

1. An information processing device comprising:
    an image capturing device configured to capture a movement of an object within a moving image, wherein the object is a person;
    an input value acquisition unit configured to estimate an amount of movement of the object with respect to the image capturing device from a reference position in a three-dimensional space defined in the vertical, horizontal, and depth directions, in the moving image by referring to the head and shoulder contours of the person which is approximated by a Greek ohm-shaped curve, wherein the image of the person derived from the ohm-shaped curve is subjected to an edge extracting process, wherein one or more edges near the curve are detected so as to obtain parameters that substantially match the contours of the person and an edge image is thereby obtained, wherein the ohm-shaped curve may be translated, expanded, contracted, or rotated by changing the parameters defining the curve, wherein said edge extracting process is repeated for each frame, so that tracking of the person proceeds, wherein movement of the object is determined based, at least in part, on its horizontal and vertical coordinates relative to a reference position in a two-dimensional plane, as viewed from above the image capturing device, the vertical direction representing depth from the perspective of the image capturing device, wherein the vertical distance from the reference position is determined by the object's detected change in size relative to its size at the reference position; and
    an output data generation unit configured to make a change in a performing process according to the amount of movement in the three-dimensional space that is estimated by the input value acquisition unit and to generate output data accordingly.

2. The information processing device according to claim 1, wherein the input value acquisition unit comprises:
    a tracking processing unit configured to represent a typical shape of the object using a curve, to compute a matching score between the curve and an edge image of the image frame forming the moving image captured by the image capturing device while changing at least the magnification and the amount of translation of the curve, and to acquire, for each image frame, data on the magnification and the amount of translation that defines a curve that best matches the object in the image frame; and
    an input value conversion unit configured to estimate the amount of movement in the vertical and horizontal directions of the three-dimensional space using the data on the amount of translation acquired by the tracking processing unit, and to estimate an amount of movement in the depth direction using the data on the magnification.

3. The information processing device according to claim 1, wherein the input value acquisition unit comprises:
   a tracking processing unit configured to represent a typical shape of the object using a curve, to compute a matching score between the curve and an edge image of the image frame forming the moving image captured by the image capturing device while changing at least the magnification and the amount of translation of the curve, and to acquire, for each image frame, a curve that best matches the object in the image frame; and
   an input value conversion unit configured to estimate an amount of movement in the depth direction using the number of pixels in an area surrounded by the curve acquired by the tracking processing unit.

4. The information processing device according to claim 2, wherein the tracking processing unit represents a shape of head contour of a human being as the object using an Greek ohm-shaped curve, and the input value conversion unit estimates the amount of movement of a head of a user in the three-dimensional space.

5. The information processing device according to claim 1, wherein the output data generation unit performs a process using a variable uniquely determined by the amount of movement,
   the information processing device further comprising an initial processing unit configured to identify a range of movement of the object in the respective horizontal, vertical, and depth directions prior to the processing in the output data generation unit so as to define correspondence between the range of movement and the input value of output data generation unit.

6. The information processing device according to claim 1, wherein the output data generation unit performs a process using a variable uniquely determined by the amount of movement, based on predefined correspondence,
   the information processing device further comprising an initial processing unit configured to display on the display device a mirror image of a user captured by the image capturing device prior to the processing by the output data generation unit, display a curve representing a typical shape of the object at a position on the mirror image corresponding to end points of a permitted range of movement of the object in the respective directions and defined by the correspondence, and let the user recognize the permitted range of movement of the object by moving the object on a displayed image so that the curve matches an actual contour line of the object.

7. The information processing device according to claim 1, wherein the input value acquisition unit estimates an actual amount of movement in the vertical and horizontal directions by correcting an apparent amount of movement in the vertical and horizontal directions determined by using the image capturing device, based on an amount of movement of the object in the depth direction.

8. The information processing device according to claim 1, wherein the output data generation unit does not reflect a variation in the amount of movement in the process performed when the amount of movement from the reference position in the three-dimensional space does not exceed a predefined threshold value.

9. The information processing device according to claim 2, wherein the input value conversion unit subjects the data on an amount of translation and the data on magnification acquired in each image frame to noise-removal filtering, using a temporal change in the data for preceding image frames, thereby correcting the data accordingly.

10. The information processing device according to claim 4,
   wherein the output data generation unit generates data for an image representing a field of view of a user in a virtual world, change a viewpoint in the field of view in accordance with an amount of head movement of the user in the three-dimensional space,
   and the information processing device further comprises a display device configured to display the image generated by the output data generation unit so that the user can see the image as the user moves in the three-dimensional space.

11. The information processing device according to claim 4,
   wherein the output data generation unit generates data for an image representing an object indicating a user in a virtual world, move the object in accordance with an amount of head movement of the user in the three-dimensional space,
   and the information processing device further comprises a display device configured to display the image generated by the output data generation unit so that the user can see the image as the user moves in the three-dimensional space.

12. An information processing device comprising:
   an image capturing device configured to capture a movement of an object within a moving image, wherein said object is a person;
   an input value acquisition unit configured to estimate an amount of movement of the object with respect to the image capturing device from a reference position in a two-dimensional space defined in the vertical and horizontal directions, and further estimate a distance in the depth direction from the reference position, from the moving image by referring to the head and shoulder contours of the person which is approximated by a Greek ohm-shaped curve, wherein the image of the person derived from the ohm-shaped curve is subjected to an edge extracting process, wherein one or more edges near the curve are detected so as to obtain parameters that substantially match the contours of the person and an edge image is thereby obtained, wherein the ohm-shaped curve may be translated, expanded, contracted, or rotated by changing the parameters defining the curve, wherein said edge extracting process is repeated for each frame, so that tracking of the person proceeds, wherein movement of the object is determined based, at least in part, on its horizontal and vertical coordinates relative to a reference position in a two-dimensional plane, as viewed from above the image capturing device, the vertical direction representing depth from the perspective of the image capturing device, wherein the vertical distance from the reference position is determined by the object's detected change in size relative to its size at the reference position; and
   an output data generation unit configured to make a change in a performing process according to the amount of movement in the two-dimensional space estimated by the input value acquisition unit and generate output data accordingly, wherein the input value acquisition unit estimates an actual amount of movement in the vertical and horizontal directions by correcting an apparent amount of movement in the vertical and horizontal directions determined by using the image capturing device, based on the distance of the object from the reference position in the depth direction.

13. An information processing method comprising:
capturing a movement of an object within a moving image using an image capturing device, wherein said object is a person;
estimating an amount of movement of the object with respect to the image capturing device from a reference position in a three-dimensional space defined in the vertical, horizontal, and depth directions, in the moving image by referring to the head and shoulder contours of the person which is approximated by a Greek ohm-shaped curve, wherein the image of the person derived from the ohm-shaped curve is subjected to an edge extracting process, wherein one or more edges near the curve are detected so as to obtain parameters that substantially match the contours of the person and an edge image is thereby obtained, wherein the ohm-shaped curve may be translated, expanded, contracted, or rotated by changing the parameters defining the curve, wherein said edge extracting process is repeated for each frame, so that tracking of the person proceeds, wherein movement of the object is determined based, at least in part, on its horizontal and vertical coordinates relative to a reference position in a two-dimensional plane, as viewed from above the image capturing device, the vertical direction representing depth from the perspective of the image capturing device, wherein the vertical distance from the reference position is determined by the object's detected change in size relative to its size at the reference position; and
making a change in a performing process according to the estimated amount of movement in the three-dimensional space and generating output data accordingly.

14. The information processing method according to claim 13,
wherein the generation of output data comprises generating data for a moving image that varies in accordance with the amount of movement of the object in the three-dimensional space,
the method further comprising displaying the moving image.

15. A computer program embedded in a non-transitory computer-readable recording medium, comprising:
a module configured to capture a movement of an object within a moving image using an image capturing device, wherein said object is a person;
a module configured to estimate an amount of movement of the object with respect to the image capturing device from a reference position in a three-dimensional space defined in the vertical, horizontal, and depth directions, in the moving image by referring to the head and shoulder contours of the person which is approximated by a Greek ohm-shaped curve, wherein the image of the person derived from the ohm-shaped curve is subjected to an edge extracting process, wherein one or more edges near the curve are detected so as to obtain parameters that substantially match the contours of the person and an edge image is thereby obtained, wherein the ohm-shaped curve may be translated, expanded, contracted, or rotated by changing the parameters defining the curve, wherein said edge extracting process is repeated for each frame, so that tracking of the person proceeds, wherein movement of the object is determined based, at least in part, on its horizontal and vertical coordinates relative to a reference position in a two-dimensional plane, as viewed from above the image capturing device, the vertical direction representing depth from the perspective of the image capturing device, wherein the vertical distance from the reference position is determined by the object's detected change in size relative to its size at the reference position; and
a module configured to make a change in a performing process according to the estimated amount of movement in the three-dimensional space and to generate output data accordingly.

16. A non-transitory computer-readable recording medium having embodied thereon a computer program comprising:
a module configured to capture a movement of an object within a moving image using an image capturing device, wherein said object is a person;
a module configured to estimate an amount of movement of the object with respect to the image capturing device from a reference position in a three-dimensional space defined in the vertical, horizontal, and depth directions, in the moving image by referring to the head and shoulder contours of the person which is approximated by a Greek ohm-shaped curve, wherein the image of the person derived from the ohm-shaped curve is subjected to an edge extracting process, wherein one or more edges near the curve are detected so as to obtain parameters that substantially match the contours of the person and an edge image is thereby obtained, wherein the ohm-shaped curve may be translated, expanded, contracted, or rotated by changing the parameters defining the curve, wherein said edge extracting process is repeated for each frame, so that tracking of the person proceeds, wherein movement of the object is determined based, at least in part, on its horizontal and vertical coordinates relative to a reference position in a two-dimensional plane, as viewed from above the image capturing device, the vertical direction representing depth from the perspective of the image capturing device, wherein the vertical distance from the reference position is determined by the object's detected change in size relative to its size at the reference position; and
a module configured to make a change in a performing process according to the estimated amount of movement in the three-dimensional space and to generate output data accordingly.

* * * * *